United States Patent
Cala

[15] 3,680,244
[45] Aug. 1, 1972

[54] FISHING SIGNAL
[72] Inventor: James S. Cala, Keithwood Dr., R.D. #3, Valencia, Pa. 16059
[22] Filed: July 14, 1970
[21] Appl. No.: 54,753

[52] U.S. Cl. ................................................43/17
[51] Int. Cl. .............................................A01k 97/12
[58] Field of Search..........................................43/17

[56] References Cited

UNITED STATES PATENTS

| | | | |
|---|---|---|---|
| 2,948,076 | 8/1960 | Patricello | 43/17 |
| 1,737,921 | 12/1929 | Derr | 43/17 |
| 3,041,769 | 7/1962 | Bray et al | 43/17 |

Primary Examiner—Samuel Koren
Assistant Examiner—Daniel J. Leach
Attorney—Linton & Linton

[57] ABSTRACT

A signal device for indicating the bite of a fish on a fishing line is attached to a support for a fishing rod and comprises a housing of current-conducting material for a battery and a battery-operated lamp. A lever of current-conducting material is pivotally mounted on the housing and the fishing line engages the end of the lever. An electrical contact is positioned on the housing near the lever. A pull on the line will pivot the lever into engagement with the contact to complete the circuit to the lamp and provide a visual signal to the fisherman.

2 Claims, 4 Drawing Figures

PATENTED AUG 1 1972
3,680,244
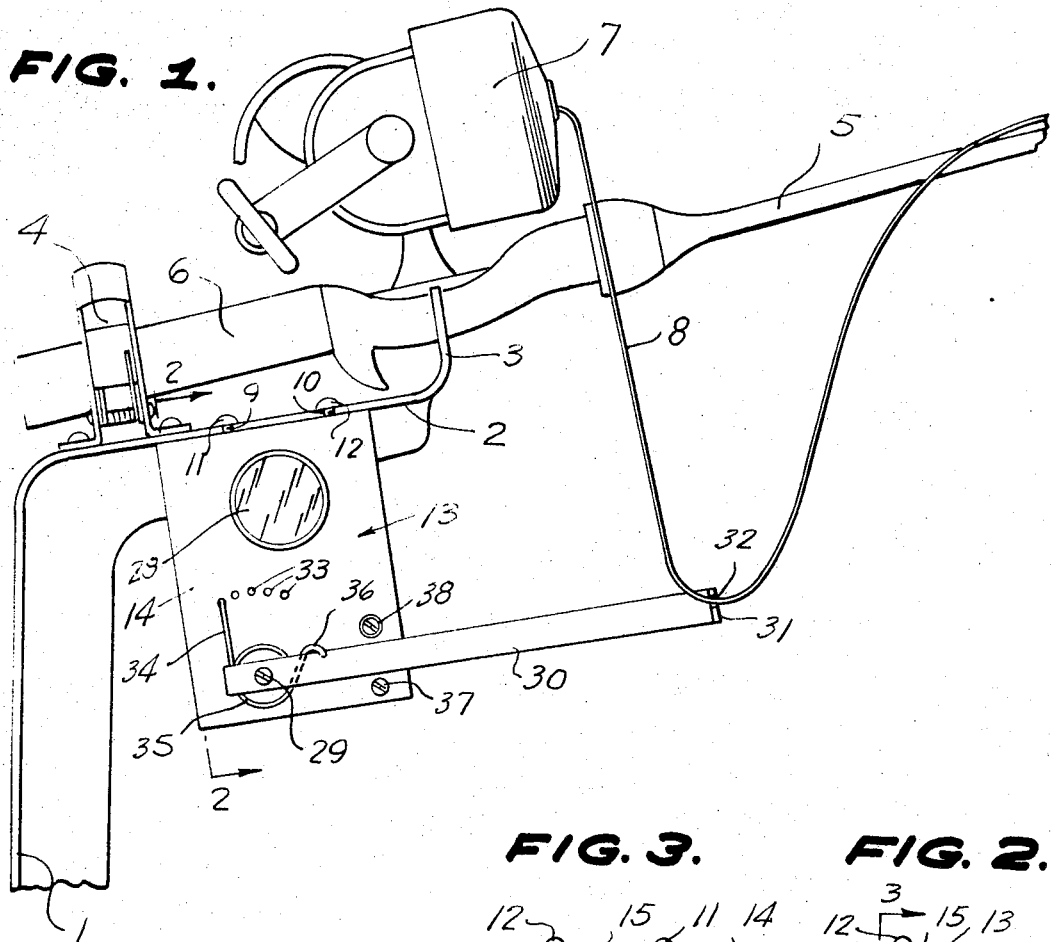
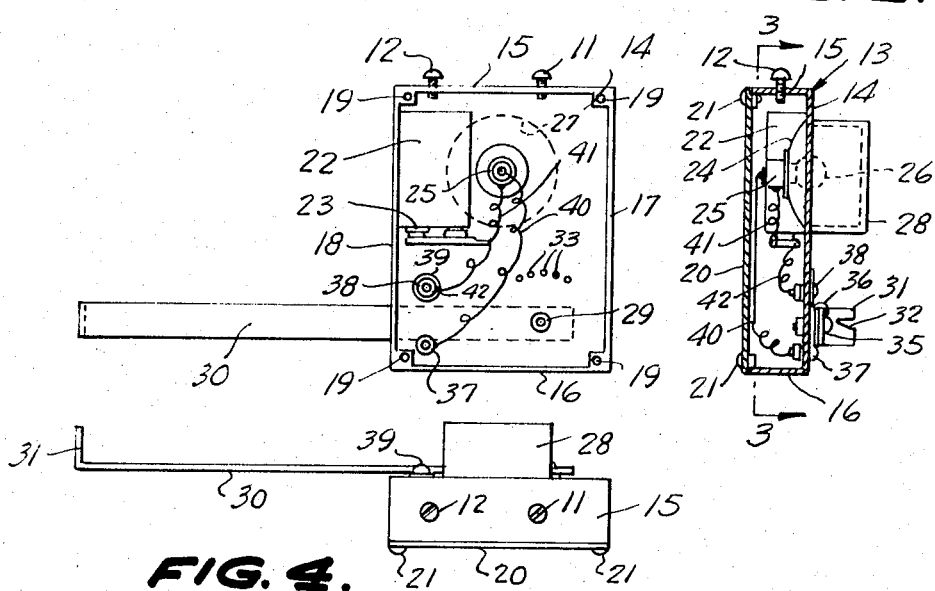
INVENTOR.
JAMES S. CALA,
BY
Linton and Linton
ATTORNEYS.

FISHING SIGNAL

The present invention is concerned with a signalling device for indicating when a fish is biting on bait attached to a fishing rod line connected to said signal.

The principal object of the present invention is to provide a signalling device operable by a fishing line when fish are biting on bait attached to said line and which signalling device and a fishing rod for said line can be connected to the same fishing rod holder.

A further important object of the invention is to provide a fish-biting indicator which can be permanently or detachably connected to a fishing rod holder on which a fishing rod is detachably supported and which indicator will not interfere with the removal or mounting of the fishing rod relative to the holder and can be quickly and easily detached from or attached to the fishing line of said rod.

Another important object of the invention is to provide a visual signal operable by a fishing line to indicate when a fish is biting on said line and which signal can be of various colors keyed to the bait being used on the line whereby a plurality of such signals can be used each with a different line and bait to show which bait is attracting the most fish.

Further objects of the invention will be in part obvious and in part pointed out in the following detailed description of the accompanying drawing, in which, FIG. 1 is a partial side elevation of a fishing rod holder and fishing rod with signal thereon as in use, FIG. 2 is a cross-sectional view of the present signal taken on line 2—2 of FIG. 1, FIG. 3 is a sectional view taken on line 3—3 of FIG. 2, and FIG. 4 is a top the of the signal.

Referring now more particularly to he accompanying drawing in which like and corresponding parts are indicated by similar reference numerals, 1 indicates the shaft of a fishing rod holder which has a lateral support 2 with upturned free end 3 and with resilient clamp 4 attached to said support.

A conventional fishing rod 5 has handle 6 detachably held by clamp 4 and resting on the end of free end 3. Reel 7 attached to said handle has line 8 extending therefrom and along rod 5 in the usual manner.

Support 2 has edge slots or recesses 9 and 10 in which are positioned screws 11 and 12, respectively.

A signal 13 has an open-front box 14–18 including back 14 of current conducting material, top wall 15, bottom wall 16, and side walls 17 and 18. Threaded openings 19 are provided at the wall corners on the open front of said box so that cover 20 can be attached thereto by screws 21.

A battery case 22 is attached to back 14 and side wall 18 and connectors 23 are attached to the terminals of the battery in said case.

A reflector 24 is attached to back 14 and covers an opening 27 in said back. Lamp socket 25 is mounted through reflector 24 and has a lamp 26 attached thereto. A cylindrical lens 28 is attached to the exterior of back 14 enclosing opening 27 and lamp 26.

A bolt 29 extends through back 14 and an end portion of lever 30 pivotally supporting said lever. A nut on bolt 29 retains lever 30 thereon. The other end portion 31 of said lever is bent to extend normal to said lever and has a side notch 32 therein.

A semi-circular series of openings 33 extend through back 14 and an end of leg 34 of coil spring 35 extends into one of said openings. Spring 35 is wound around bolt 29 between back 14 and lever 30 and has a second leg 36 hooked over the top of lever 30, tending to hold lever 30 abutting the head of bolt 37 extending through back 14. A nut holds bolt 37 on said back and said bolt provides an electrical conductor to back 14.

A third bolt 38 providing a contact also extends through back 14 and is insulated from said back by a sleeve 39 of electrical insulating material. A nut also retains bolt 38 on back 14.

Wire 40 is attached to one terminal of socket 25 and to bolt 37. Wire 41 is attached to the other terminal of socket 25 and one terminal of the battery. Wire 42 is attached to the other terminal of the battery and to bolt 38.

Back opening 27 is threaded and lens 28 has a threaded peripheral portion at its open end in threaded engagement with said back opening threads. Reflector 24 is attached to back 14 by solder and battery case 22 is also attached to back 14 as by solder or welding.

In the use of the present signal as for night fishing, screws 11 and 12 are slid into support slots 9 and 10, respectively, and tightened into top wall 15 of the signal, fastening the signal to support 2. Shaft 1 is inserted at its lower end into a supporting surface such as the ground, beach or the like where it is desired to fish until said shaft will remain upright with the fishing rod 5 extending out towards the water. Line 8 is inserted in notch 32 of lever 30 as shown in FIG. 1 and the baited hook of said line dropped into the water. At such time, no current is passing to lamp 26 and thus no light shines through lens 28. However, when a fish bites on the baited hook on line 8, it will pull said line taut, tending to straighten said line between reel 7 and rod 5 and raising lever 30 about bolt 29. Said raised lever will contact bolt 38 and said lever being of a current-conducting material will complete the circuit for lamp 26, lighting said lamp and thus a visual signal will be seen through lens 28 to the fisherman. That is, current will flow from one terminal of the battery in casing 22 through wire 42 to bolt 38, then through lever 30 to bolt 29, from bolt 29 through back 14 to bolt 37, wire 40, lamp socket 25, lamp 26, and wire 41 to the other terminal of said battery. When the fish is caught and removed from the hook, line 8 will allow lever 30 to drop under the action of spring 35 breaking the circuit and discontinuing the visual indication by lamp 26.

The tension on spring 35 can be varied by moving leg 34 into anyone of the openings 33 to obtain the desired tension of said spring.

A fisherman can use a number of the present supports, rods and signals and the lighting of lamp 26 in any one of the signals will indicate to him the line on which the fish is biting. Also different bait can be used on different lines 8 and lenses 28 of different colors used so as to indicate which bait is attracting the fish.

Signals 13 can be permanently or detachably connected to the supports 2 and when desired, can be quickly and readily detached as when the fishing rod is to be used without the signal. Also line 8 can be quickly and easily attached or detached from lever 30 as said line is merely inserted sideways in notch 32.

The present signal 13 can as well be used with other types of fishing rod supports and fishing rods than those shown in the drawing.

I claim:

1. A signal for use with a fishing rod support and fishing rod thereon comprising a housing attachable to the fishing rod support, a lamp mounted on and visible exteriorly of said housing, a lever of current conducting material pivotally connected to said housing and having a notch for receiving the fishing line therein, a battery having a terminal connected to said lamp, a contact mounted on and insulated from said housing, positioned for being contacted at times by said lever and connected to a second terminal of said battery, means electrically connecting said lever to said lamp, a coil spring having a leg on said lever and a second leg, and said housing having a series of openings whereby said spring second leg can be selectively inserted in any one of said series of openings to vary the tension of said spring.

2. A signal for use with a fishing rod support and fishing rod thereon comprising a housing of current conducting material, being attachable to the fishing rod support, a lamp mounted on and visible exteriorly of said housing, a lever of current conducting material pivotally and electrically connected to said housing and having a notch for receiving the fishing line therein, a battery having a terminal connected to said lamp, a contact mounted on and insulated from said housing, positioned for being contacted at times by said lever and connected to a second terminal of said battery and a conductor connected to said housing and to said lamp.

* * * * *